US008866797B2

(12) United States Patent
Kiyose

(10) Patent No.: US 8,866,797 B2
(45) Date of Patent: Oct. 21, 2014

(54) DISPLAY DEVICE WITH POSITION DETECTING FUNCTION AND ELECTRONIC APPARATUS

(75) Inventor: Kanechika Kiyose, Suwa (JP)

(73) Assignee: Epson Imaging Devices Corporation (JP)

( * ) Notice: Subject to any disclaimer, the term of this patent is extended or adjusted under 35 U.S.C. 154(b) by 620 days.

(21) Appl. No.: 12/709,177

(22) Filed: Feb. 19, 2010

(65) Prior Publication Data

US 2010/0225616 A1 Sep. 9, 2010

(30) Foreign Application Priority Data

Mar. 4, 2009 (JP) ................................. 2009-050288

(51) Int. Cl.
G06F 3/042 (2006.01)
G06F 3/041 (2006.01)

(52) U.S. Cl.
CPC .............. *G06F 3/0412* (2013.01); *G06F 3/042* (2013.01)
USPC ......... 345/175; 345/173; 345/179; 178/18.09

(58) Field of Classification Search
CPC ..... G06F 3/033; G06F 3/0321; G06F 3/0325; G06F 3/0421; G06F 2203/04104; G06F 2203/04109; G96F 3/042; G96F 3/0317
USPC .................. 345/76, 102, 173, 179, 156–158, 345/165–166, 175; 178/18.01–18.06, 178/18.09, 19.01, 19.05, 18.11; 250/221; 349/64–67
See application file for complete search history.

(56) References Cited

U.S. PATENT DOCUMENTS

| | | | |
|---|---|---|---|
| 2003/0034439 A1* | 2/2003 | Reime et al. ................... | 250/221 |
| 2005/0259440 A1* | 11/2005 | Onishi et al. .................. | 362/613 |
| 2006/0017709 A1* | 1/2006 | Okano .......................... | 345/173 |
| 2006/0192755 A1* | 8/2006 | Blythe et al. ................. | 345/158 |
| 2007/0296688 A1* | 12/2007 | Nakamura et al. ............. | 345/102 |
| 2008/0074401 A1* | 3/2008 | Chung et al. .................. | 345/175 |
| 2008/0122803 A1* | 5/2008 | Izadi et al. .................... | 345/175 |
| 2008/0180530 A1* | 7/2008 | Keam .......................... | 348/207.1 |
| 2008/0316767 A1* | 12/2008 | Woo et al. ..................... | 362/612 |
| 2009/0135162 A1* | 5/2009 | Van De Wijdeven et al. | 345/175 |
| 2009/0256810 A1* | 10/2009 | Pasquariello ................. | 345/173 |
| 2009/0267919 A1* | 10/2009 | Chao et al. .................... | 345/175 |
| 2010/0060611 A1* | 3/2010 | Nie ............................... | 345/175 |

\* cited by examiner

*Primary Examiner* — Lun-Yi Lao
*Assistant Examiner* — Saiful A Siddiqui
(74) *Attorney, Agent, or Firm* — Harness, Dickey & Pierce, P.L.C.

(57) ABSTRACT

A display device with a position detecting function includes: an optical position detecting device which includes a position detecting light source for alternately emitting position detecting infrared light having a light amount attenuated along a predetermined direction and position detecting infrared light having a light amount attenuated along a reverse direction of the predetermined direction, and a light receiving element for receiving the position detecting infrared light reflected by a target object inside a detection region, and which detects a position of the target object on the basis of a light amount detection result of the light receiving element; and an image creating device which includes an image display region of an electric optical panel in a region overlapped with the detection region, wherein the light receiving element is constituted by a semiconductor element formed on the electric optical panel.

19 Claims, 8 Drawing Sheets

DISPLAY DEVICE WITH POSITION DETECTING FUNCTION AND ELECTRONIC APPARATUS

BACKGROUND

1. Technical Field

The present invention relates to a display device with a position detecting function and an optical position detecting device, and an electronic apparatus having the display device with the position detecting function.

2. Related Art

Recently, in electronic apparatuses such as a cellular phone, a car navigation device, a personal computer, a ticket vending machine, and a bank terminal, a display device with a position detecting function has been used in which a touch panel is disposed on a front surface of an image creating device such as a liquid crystal device. In the display device with the position detecting function, an information input is performed by referring to an image displayed on the image creating device. The touch panel is provided as a position detecting device which detects a position of a target object inside a detection region.

As a detection method of the position detecting device, there are known various methods using a resistive film, an ultrasonic wave, an electrostatic capacity, an optical system, and the like. In the method of using the resistive film, the cost is low, but the permeability is low like the method using the electrostatic capacity. In the method using the ultrasonic wave or the electrostatic capacity, the response speed is high, but the environment resistance is low. On the contrary, in the method using the optical system, it is characterized in that the permeability and the response speed are high (refer to JP-A-2004-295644 and JP-A-2004-303172).

However, in the optical position detecting device disclosed in JP-A-2004-295644 and JP-A-2004-303172, a light receiving element is attached to the outside of an electric optical panel. For this reason, there is a problem in that a size in the thickness direction or the external shape of the optical position detecting device increases by at least a space used to dispose the light receiving element. In addition, in the configuration in which the light receiving element is attached to the outside of the electric optical panel, there is a problem in that a cost increases.

SUMMARY

An advantage of some aspects of the invention is that it provides a display device with a position detecting function capable of realizing a decrease in size and cost by improving a configuration of a position detecting light receiving element, and an electronic apparatus having the display device with the position detecting function.

According to an aspect of the invention, there is provided a display device with a position detecting function including: an optical position detecting device which includes a position detecting light source for alternately emitting position detecting infrared light having a light amount attenuated along a predetermined direction and position detecting infrared light having a light amount attenuated along a reverse direction of the predetermined direction, and a light receiving element for receiving the position detecting infrared light reflected by a target object inside a detection region, and which detects a position of the target object on the basis of a light amount detection result of the light receiving element; and an image creating device which includes an image display region of an electric optical panel in a region overlapped with the detection region, wherein the light receiving element is constituted by a semiconductor element formed on the electric optical panel.

In the display device, since there are provided the optical position detecting device and the image creating device, a semiconductor element formed on an electric optical panel is used as the light receiving element of the optical position detecting device. For this reason, since it is not necessary to attach the light receiving element to the outside, it is possible to decrease the size in the external shape or the thickness direction of the optical position detecting device and the display device with the position detecting function by as much as the space used to dispose the light receiving element. In addition, since it is not necessary to attach the light receiving element to the outside of the electric optical panel or the like, it is possible to realize a decrease in cost.

In the display device, the light receiving element may be formed on a substrate where a pixel electrode is formed in the electric optical panel. Since a pixel switching transistor and the like are formed on the substrate where the pixel electrode is formed in the electric optical panel, it is possible to form the light receiving element by using a part of the manufacturing process of the pixel switching transistor. Accordingly, even in the case where the light receiving element is formed on the electric optical panel, it is possible to maximally suppress an increase in the number of the manufacturing processes.

In the display device, the light receiving element may be formed within the image display region of the electric optical panel. Since the image display region of the electric optical panel is overlapped with the detection region of the optical position detecting device, when the light receiving element is formed within the image display region, it is possible to reliably receive the position detecting infrared light reflected by the target object.

In the display device, one light receiving element may be formed on the electric optical panel, or a plurality of the light receiving elements may be formed on the electric optical panel.

In the display device, in the case where a plurality of the light receiving elements is formed on the electric optical panel, the position detecting infrared light reflected by each of two or more target objects within the detection region may be independently received by the plurality of light receiving elements, so that each position of the two or more target objects is detected. With such a configuration, since it is possible to detect the positions of two or more target objects inside the detection region, it is possible to perform an information input by using a relative movement of two or more target objects.

In the display device, the electric optical panel may include pixels corresponding to a plurality of different colors, and the light receiving elements may be formed in the pixels corresponding to the same color. With such a configuration, for example, in the pixel provided with the light receiving element, even when a pixel aperture ratio (a ratio of a display light emitting region in the pixel) is reduced, since it is possible to perform a countermeasure in such a manner that an image signal for the pixel of the corresponding color is corrected to increase a luminance, it is possible to display a high quality level of color image. In addition, in the case where there are pixels of red (R), green (G), and blue (B), when the light receiving element is formed in the pixel of green (G) having the highest visibility among these three colors, even when the pixel aperture ratio of the pixel of green (G) is reduced, it is possible to display a high quality level of color image.

In the display device, the optical position detecting device may include a light guiding plate which is disposed on one side of the electric optical panel opposite to the other side where the detection region is located, the light guiding plate including a light incident surface for receiving therein the position detecting infrared light emitted from the position detecting light source and a light emitting surface for emitting the position detecting infrared light incident from the light incident surface toward the detection region. With such a configuration, when the position detecting infrared light is emitted from the light emitting surface of the light guiding plate and is reflected by the target object disposed on the light emitting side of the light guiding plate, the reflected light is detected by the light receiving element. Here, the attenuation rate until the position detecting infrared light is propagated into the light guiding plate and is emitted therefrom is different in accordance with the position. Accordingly, on the basis of the detection result of the light receiving element, it is possible to detect the position of the target object. Therefore, since it is not necessary to dispose a plurality of optical elements along the detection region, it is possible to form the position detecting device at a low cost.

In the display device, as the position detecting light source, a first position detecting light source emitting first position detecting infrared light and a second position detecting light source emitting second position detecting infrared light may be provided. With such a configuration, on the basis of a light amount ratio, a phase difference, or the like of the detection results obtained by the first and second position detecting light sources, it is possible to accurately detect the moving position of the target object in a direction in which the first and second position detecting light sources move away from each other.

In the display device, two pairs of light sources each including the first and second position detecting light sources may be provided, and the two pairs of light sources may face directions in which emitted light axes intersect each other. With such a configuration, on the basis of a light amount ratio, a phase difference, or the like of the detection results obtained by the first and second position detecting light sources of one pair of light sources, it is possible to detect the moving position of the target object in a direction in which the first and second position detecting light sources of one pair of light sources move away from each other. In addition, on the basis of a light amount ratio, a phase difference, or the like of the detection results obtained by the first and second position detecting light sources of the other pair of light sources, it is possible to detect the moving position of the target object in a direction in which the first and second position detecting light sources of the other pair of light sources move away from each other.

The display device with the position detecting function according to the aspect of the invention is used in electronic apparatuses such as a cellular phone, a car navigation device, a personal computer, a ticket vending machine, and a bank terminal.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, exemplary embodiments of the invention will be described in detail with reference to the accompanying drawings.

First Embodiment

Entire Configuration

Figure 1:
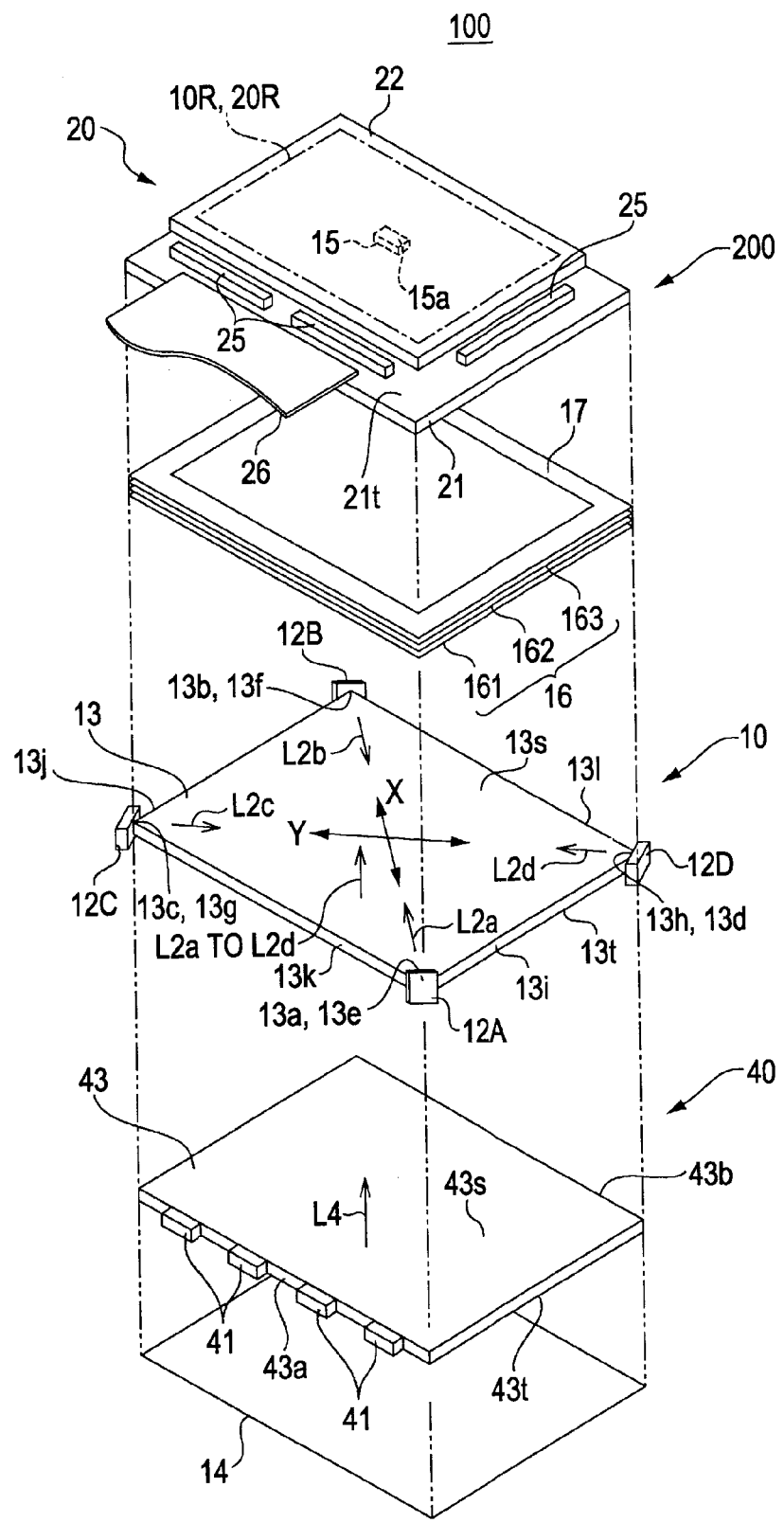
FIG. 1 is an exploded perspective view schematically illustrating a configuration of a display device with a position detecting function according to a first embodiment of the invention.
Figure 2A:
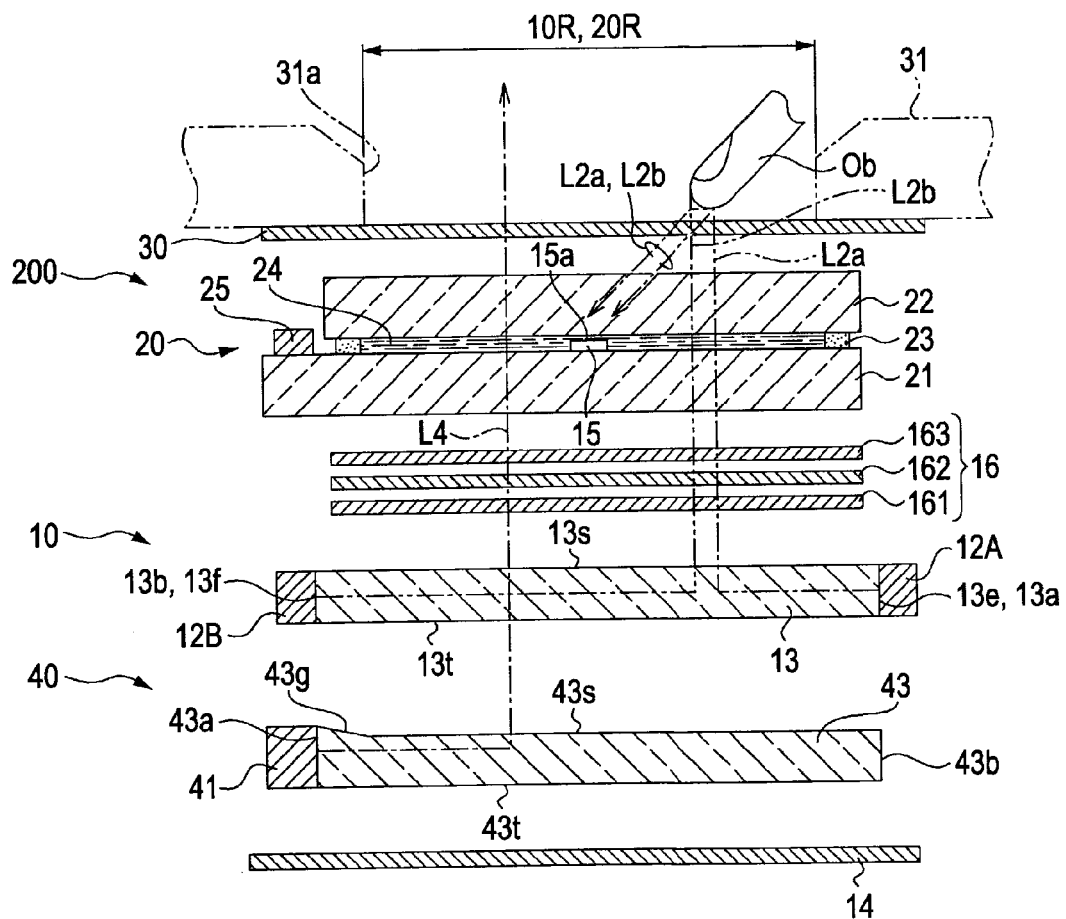
FIG. 2A is a sectional view schematically illustrating a sectional configuration of the display device with the position detecting function according to the first embodiment of the invention.
Figure 2B:
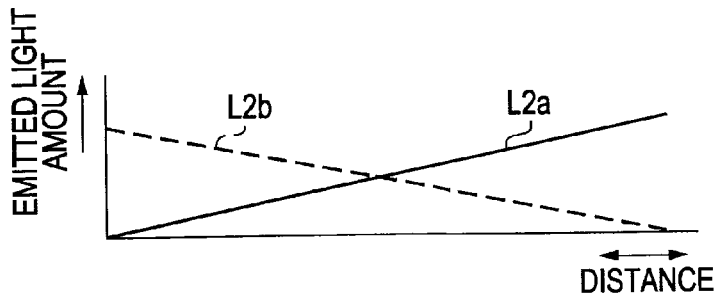
FIG. 2B is an explanatory diagram illustrating an attenuation state of position detecting infrared light inside a light guiding plate.

FIG. 1 is an exploded perspective view schematically illustrating a configuration of a display device with a position detecting function according to a first embodiment of the invention. FIG. 2A is a sectional view schematically illustrating a sectional configuration of the display device with the position detecting function according to the first embodiment of the invention, and FIG. 2B is an explanatory diagram illustrating an attenuation state of position detecting infrared light inside a light guiding plate.

In FIGS. 1 and 2A, a display device 100 with a position detecting function according to the embodiment includes an optical position detecting device 10 and an image creating device 200. The optical position detecting device 10 detects a planar position of a target object Ob when the target object Ob such as a finger moves close to a detection region 10R on the basis of, for example, an image displayed by the image creating device 200.

The optical position detecting device 10 includes position detecting light sources 12A to 12D which emit position detecting infrared light L2a to L2d, a light guiding plate 13 which includes light incident portions 13a to 13d formed on the peripheral end surface portions thereof so as to allow the position detecting infrared light L2a to L2d to be incident thereto, and a light receiving element 15 which is disposed to face a light receiving portion 15a in the detection region 10R. The light guiding plate 13 includes a light emitting surface 13$s$ which is formed on one surface (in the drawing, the front surface) so as to emit the position detecting infrared light L2$a$ to L2$d$ propagated thereinto. The position detecting light sources 12A to 12D are disposed so as to face the light incident portions 13$a$ to 13$d$, and are desirably disposed so as to be close to the light incident portions 13$a$ to 13$d$.

The light guiding plate 13 is formed from a transparent resin plate such as polycarbonate or acrylic resin. In the light guiding plate 13, the light emitting surface 13$s$ or the rear surface 13$t$ on the opposite side of the light emitting surface 13$s$ is provided with a surface unevenness structure, a prism structure, a scattering layer (not shown), and the like. With such a light scattering structure, light being incident from the light incident portions 13$a$ to 13$d$ and propagated into the light guiding plate is gradually deflected as it moves in the propagation direction thereof, and is emitted from the light emitting surface 13$s$. A reflection plate 14 constituted by a reflection sheet or the like is disposed in rear of the light guiding plate 13, and the reflection plate 14 serves to return the position detecting infrared light L2$a$ to L2$d$, emitted from the rear surface 13$t$ of the light guiding plate 13, into the light guiding plate 13.

In the embodiment, the light guiding plate 13 has a substantially square-like planar shape having four side portions 13$i$ to 13$l$, and four corner portions 13$e$ to 13$h$ thereof are respectively formed as the light incident portions 13$a$ to 13$d$. Here, the light incident portions 13$a$ to 13$d$ are formed as, for example, end surfaces (light incident surfaces) formed by removing the corner portions 13$e$ to 13$h$ of the light guiding plate 13.

For example, each of the position detecting light sources 12A to 12D is formed as a light emitting element such as an LED (light emitting diode), and emits the position detecting infrared light L2$a$ to L2$d$ in response to a driving signal output from a driving circuit (not shown). Here, it is desirable that each of the position detecting infrared light L2$a$ to L2$d$ has a wavelength range in which the light is efficiently reflected by the target object Ob such as a finger or a touch pen. For example, when the target object Ob is a human body such as a finger, infrared light having high reflectivity with respect to a surface of the human body, for example, near infrared light in the vicinity of 850 nm of wavelength is desirable.

Essentially, a plurality of the position detecting light sources 12A to 12D is provided, and is configured to emit the position detecting infrared light at different positions. In the embodiment, among four position detecting light sources 12A to 12D, two arbitrary position detecting light sources make a pair to thereby constitute a pair of first light sources and the other two position detecting light sources make a pair to thereby constitute a pair of second light sources. In the embodiment, the position detecting light sources 12A and 12B disposed at the diagonal positions of the light guiding plate 13 constitute the pair of first light sources, and the other two position detecting light sources 12C and 12D constitute the pair of second light sources. In this case, in the pair of first light sources, one of the two position detecting light sources 12A and 12B is used as a first position detecting light source, and the other thereof is used as a second position detecting light source. Accordingly, in the pair of first light sources, the position detecting infrared light L2$a$ corresponds to first position detecting infrared light, and the position detecting infrared light L2$b$ corresponds to second position detecting infrared light. In addition, one of the light incident portions 13$a$ and 13$b$ of the light guiding plate 13 corresponds to a first light incident portion, and the other thereof corresponds to a second light incident portion. For this reason, in the pair of first light sources, the first position detecting light source 12A and the second position detecting light source 12B face each other with the light guiding plate 13 interposed therebetween.

In addition, in the pair of second light sources, one of the two position detecting light sources 12C and 12D is used as the first position detecting light source, and the other thereof is used as the second position detecting light source. Accordingly, in the pair of second light sources, the position detecting infrared light L2$c$ corresponds to the first position detecting infrared light, and the position detecting infrared light L2$d$ corresponds to the second position detecting infrared light. In addition, one of the light incident portions 13$c$ and 13$d$ of the light guiding plate 13 corresponds to the first light incident portion, and the other thereof corresponds to the second light incident portion. For this reason, in the pair of second light sources, the first position detecting light source 12C and the second position detecting light source 12D face each other with the light guiding plate 13 interposed therebetween.

In the display device 100 with the position detecting function having such a configuration, the central optical axis of the pair of first light sources intersects the central optical axis of the pair of second light sources. For this reason, the first position detecting infrared light L2$a$ and the second position detecting infrared light L2$b$ is propagated in the opposite directions in the direction depicted by the arrow X in the inside of the light guiding plate 13, and is gradually emitted from the light emitting surface 13$s$ along the propagation direction. On the contrary, the first position detecting infrared light L2$c$ and the second position detecting infrared light L2$d$ is propagated in the opposite directions in the direction (depicted by the arrow Y) intersecting the direction depicted by the arrow X, and is gradually emitted from the light emitting surface 13$s$ along the propagation direction.

In the display device 100 with the position detecting function according to the embodiment, if necessary, the light emitting side of the light guiding plate 13 is provided with an optical sheet 16 which is used to equalize the position detecting infrared light L2$a$ to L2$d$. In the embodiment, as the optical sheet 16, there are used a first prism sheet 161 which faces the light emitting surface 13$s$ of the light guiding plate 13, a second prism sheet 162 which faces a side of the first prism sheet 161 opposite to the light guiding plate 13, and a light scattering plate 163 which faces a side of the second prism sheet 162 on the opposite side of the light guiding plate 13. In addition, on the side of the optical sheet 16 opposite to the light guiding plate 13, a rectangular frame-shaped light shielding sheet 17 is disposed in the periphery of the optical sheet 16. The light shielding sheet 17 prevents a leakage of the position detecting infrared light L2$a$ to L2$d$ emitted from the position detecting light sources 12A to 12D.

Configuration of Image Creating Device 200

The image creating device 200 includes an electric optical panel 20 which is disposed on one side of the optical sheet 16 (the first prism sheet 161, the second prism sheet 162, and the light scattering plate 163) opposite to the other side where the light guiding plate 13 is provided. In detail, as described below by referring to FIGS. 3 and 4, the electric optical panel 20 is a transmissive liquid crystal panel, and has a structure in which an element substrate 21 and a counter substrate 22 are bonded to each other through a sealing material 23 and a liquid crystal 24 is filled between the substrates. In the embodiment, the electric optical panel 20 is an active matrix type liquid panel, the element substrate 21 is provided with a transmissive pixel electrode, a data line, a scanning line, and a pixel switching transistor (not shown), and then the counter substrate 22 is provided with a transmissive common electrode (not shown). In addition, both pixel electrode and common electrode may be formed on the element substrate 21. In the electric optical panel 20, when a scanning signal is output to each pixel through the scanning line, and an image signal is output from a data line, the alignment of the liquid crystal 24 of each of plural pixels is controlled, and hence an image is formed on the image display region 20R.

In the electric optical panel 20, the element substrate 21 is provided with a substrate protrusion portion 21t which protrudes more than the periphery of the external shape of the counter substrate 22. Electronic components 25 constituting a driving circuit or the like are mounted onto the surface of the substrate protrusion portion 21t. In addition, the substrate protrusion portion 21t is connected to a wiring member 26 such as a flexible wiring substrate (FPC). In the case where a driving circuit is provided in the element substrate 21 itself, only the wiring member 26 is mounted onto the substrate protrusion portion 21t. If necessary, polarization plates (not shown) are disposed on the outer surfaces of the element substrate 21 and the counter substrate 22.

Here, in order to detect the planar position of the target object Ob, it is necessary to emit the position detecting infrared light L2a to L2d to the visible side on which the operation is performed by using the target object Ob, and the electric optical panel 20 is disposed closer to the visible side (operation side) than the light guiding plate 13 and the optical sheet 16. Accordingly, in the electric optical panel 20, the image display region 20R is formed so as to transmit the position detecting infrared light L2a to L2d therethrough.

The image creating device 200 includes an illumination device 40 which illuminates the electric optical panel 20. In the embodiment, the illumination device 40 is disposed on one side of the light guiding plate 13 opposite to the other side where the electric optical panel 20 is disposed so as to be located between the light guiding plate 13 and the reflection plate 14.

The illumination device 40 includes illumination light sources 41 and an illumination light guiding plate 43 which propagates and emits illumination light emitted from the illumination light source 41, and the illumination light guiding plate 43 has a rectangular planar shape. Each of the illumination light sources 41 includes, for example, a light emitting element such as an LED (light emitting diode), and emits, for example, white illumination light L4 in response to a driving signal output from a driving circuit (not shown). In the embodiment, a plurality of illumination light sources 41 is disposed along a side portion 43a of the illumination light guiding plate 43.

As shown in FIG. 2A, the illumination light guiding plate 43 has an inclined surface 43g which is formed on a surface portion (the outer peripheral portion on the side of the side portion 43a of the light emitting surface 43s) on the side of the light emitting side adjacent to the side portion 43a, and the illumination light guiding plate 43 is gradually thickened toward the side portion 43a. With the light incident structure having the inclined surface 43g, the height of the side portion 43a is made to correspond to the height of the light emitting surface of the illumination light source 41 while suppressing an increase in thickness of the portion provided with the light emitting surface 43s.

In the illumination device 40, the illumination light emitted from the illumination light source 41 is incident to the illumination light guiding plate 43 from the side portion 43a of the illumination light guiding plate 43, is propagated therein toward an outer edge portion 43b, and then is emitted from the light emitting surface 43s as one surface. Here, the illumination light guiding plate 43 has a light guiding structure which has a monotonous ratio between a light amount of the light emitted from the light emitting surface 43s and the light propagated therein from the side portion 43a to the opposite outer edge portion 43b. For example, the light guiding structure is realized by gradually increasing an area of a refraction surface having a light deflecting or light scattering minute unevenness shape and formed on the rear surface 43t or the light emitting surface 43s of the illumination light guiding plate 43, a formation density of a printed scattering layer, or the like in the internal propagation direction. Since the light guiding structure is provided, the illumination light L4 entering from the side portion 43a is almost uniformly emitted from the light emitting surface 43s.

In the embodiment, the illumination light guiding plate 43 is disposed on one side of the electric optical panel 20 opposite to the other side close to the visible side so as to be overlapped with the image display region 20R of the electric optical panel 20 in plane, and serves as so-called back light. However, the illumination light guiding plate 43 may be disposed on the visible side of the electric optical panel 20 so as to serve as so-called front light. In addition, in the embodiment, the illumination light guiding plate 43 is disposed between the light guiding plate 13 and the reflection plate 14, but the illumination light guiding plate 43 may be disposed between the optical sheet 16 and the light guiding plate 13. The illumination light guiding plate 43 and the light guiding plate 13 may be configured as a common light guiding plate. In the embodiment, the optical sheet 16 is commonly used between the illumination light L4 and the position detecting infrared light L2a to L2d. However, an exclusive optical sheet different from the optical sheet 16 may be disposed on the light emitting side of the illumination light guiding plate 43. In this case, a light scattering plate exhibiting a sufficient light scattering effect is used in many cases for the purpose of equalizing the plane luminance of the illumination light L4 emitted from the light emitting surface 43s of the illumination light guiding plate 43, but when the position detecting infrared light L2a to L2d emitted from the light emitting surface 13s of the position detecting light guiding plate 13 is largely scattered, the position detection is interrupted. For this reason, since it is necessary to omit the light scattering plate or to use the light scattering plate exhibiting a comparatively slight light scattering effect, it is desirable that the light scattering plate is exclusively used for the illumination light guiding plate 43. However, in the optical sheet such as the prism sheet (the first prism sheet 161 or the second prism sheet 162) having a light collecting effect, the light scattering plate may be commonly used.

Configuration of Detection Region

As shown in FIG. 2A, a transmissive board plate 30 is disposed on the visible side (operation side) of the electric optical panel 20. On the visible side (operation side) of the board plate 30, there is provided a surface plate 31 (depicted by the two-dotted chain line shown in FIG. 2A) which includes a frame for holding and fixing the display device 100 with the position detecting function or a casing of an electronic apparatus mounted with the display device 100 with the position detecting function. The surface plate 31 is provided with an opening 31a which exposes the detection region 10R of the optical position detecting device 10 and the image display region 20R of the electric optical panel 20 in the board plate 30.

The detection region 10R is a planar range in which the position detecting infrared light L2a to L2d is emitted to the visible side (operation side), and a planar range in which reflected light may occur by the target object Ob. In the embodiment, the planar shape of the detection region 10R is a rectangular shape, and has four side portions. The inner angle of the corner portion between the adjacent sides is set to 90°, and the inner angle is set to be identical to each inner angle of the corner portions 13e to 13h of the light guiding plate 13. However, since the inner angle of the corner portion is specified by the corner portion of the opening 31a of the surface plate 31, the inner angle may be set independently from the inner angles of the corner portions 13e to 13h of the light guiding plate 13.

In the embodiment, although the detection region 10R is specified by the opening 31a of the surface plate 31, the configuration is not particularly limited if the range permits the position detecting infrared light to be emitted to the visible side (operation side). That is, a configuration specified by the light emitting surface 13s of the light guiding plate 13, a configuration specified by the transmissive region of the position detecting infrared light of the electric optical panel 20, a configuration specified by the light shielding member, and the like may be exemplified. In addition, the board plate 30 or the surface plate 31 may not be provided. For example, a structure may be adopted in which the electric optical panel 20 is directly exposed without providing the board plate 30.

In the embodiment, the image display region 20R of the electric optical panel 20 is a planar range in which a display image is displayed in the electric optical panel 20. In the embodiment, the image display region 20R is a rectangular shape having four sides, and has the same shape as that of the detection region 10R, so that the position perfectly matches with the detection region 10R in plane. However, at least a part of the detection region 10R and the image display region 20R may be overlapped with each other in plane.

Configuration of Electric Optical Panel 20

Figure 3:
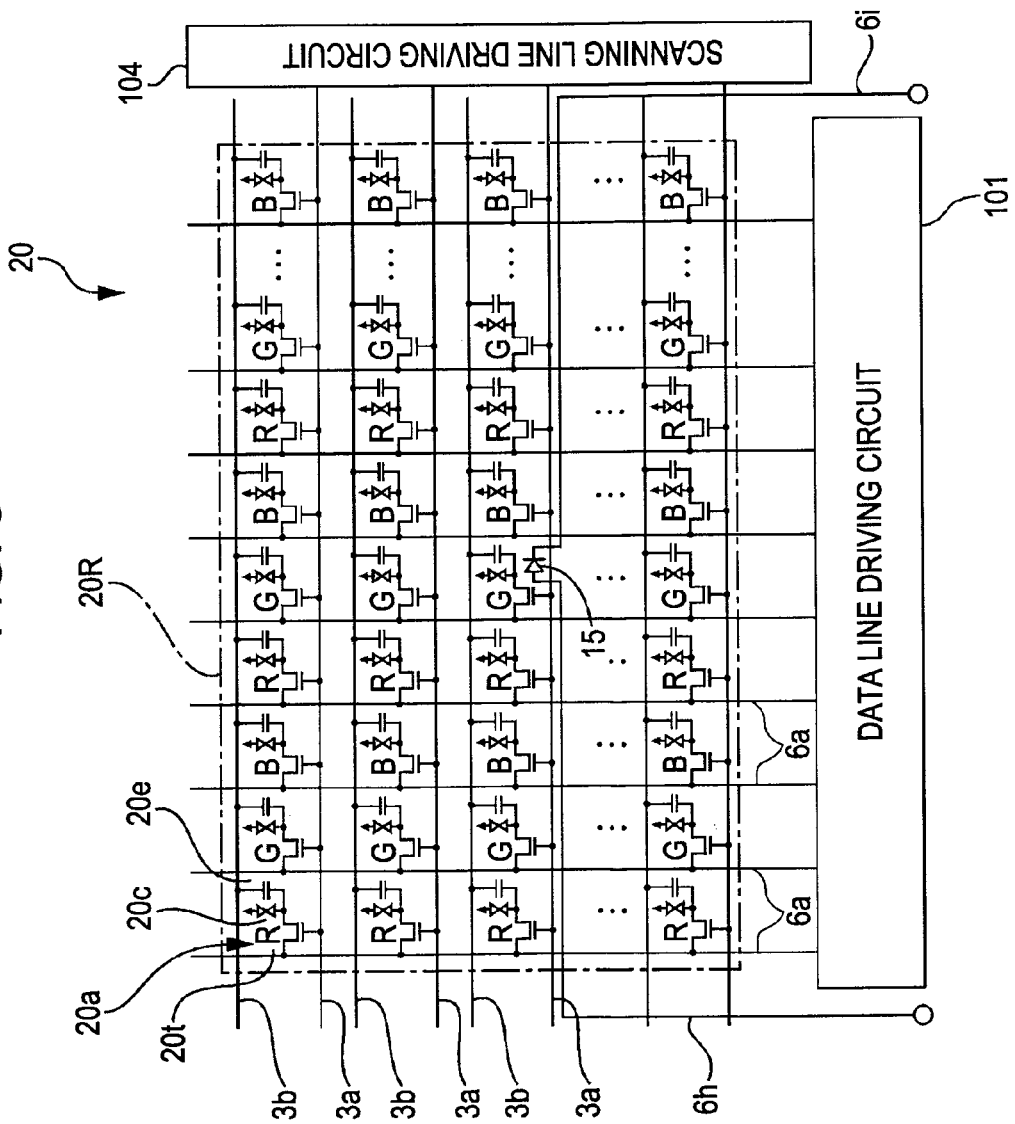
FIG. 3 is an explanatory diagram illustrating an electric configuration of an electric optical panel of the display device with the position detecting function according to the first embodiment of the invention.

FIG. 3 is an explanatory diagram illustrating an electric configuration of the electric optical panel 20 of the display device 100 with the position detecting function according to the first embodiment of the invention.

In the image creating device 200 described by referring to FIGS. 1 and 2A, the electric optical panel 20 is a transmissive liquid crystal panel, and as shown in FIG. 3, the central region thereof is formed as the image display region 20R in which a plurality of pixels 20a is disposed in a matrix shape. In the electric optical panel 20, the element substrate 21 is provided with a plurality of data lines 6a and scanning lines 3a extending in the longitudinal and transverse directions, where each pixel 20a is provided at a position corresponding to the intersection point thereof. Each of the plurality of pixels 20a is provided with a pixel electrode 9a and a thin-film transistor 20t as a pixel switching element. The data line 6a is electrically connected to a source of the thin-film transistor 20t, the scanning line 3a is electrically connected to a gate of the thin-film transistor 20t, and the pixel electrode 9a is electrically connected to a drain of the thin-film transistor 20t.

In the element substrate 21, a data line driving circuit 101 is connected to the data line 6a, and a scanning line driving circuit 104 is connected to the scanning line 3a. Here, the data line driving circuit 101 and the scanning line driving circuit 104 may be built in the electronic components 25 shown in FIG. 1 except for a case in which the data line driving circuit 101 and the scanning line driving circuit 104 are configured as a transistor simultaneously formed with the thin-film transistor 20t.

In each pixel 20a, the pixel electrode 9a faces the common electrode formed on the counter substrate 22 shown in FIG. 1 with the liquid crystal interposed therebetween, and forms a liquid crystal capacitor 20c. In addition, in each pixel 20a, in order to prevent a leakage of an image signal held by the liquid crystal capacitor 20c, a storage capacitor 20e is added in parallel to the liquid crystal capacitor 20c. In the embodiment, in order to form the storage capacitor 20e, a capacitance line 3b is provided so as to be parallel to the scanning line 3a, and the capacitance line 3b is connected to a common potential line (not shown) so as to be maintained at a predetermined potential. In addition, the storage capacitor 20e may be provided in a space from the scanning line 3a of the front stage.

Configuration of Pixel

Figure 4:
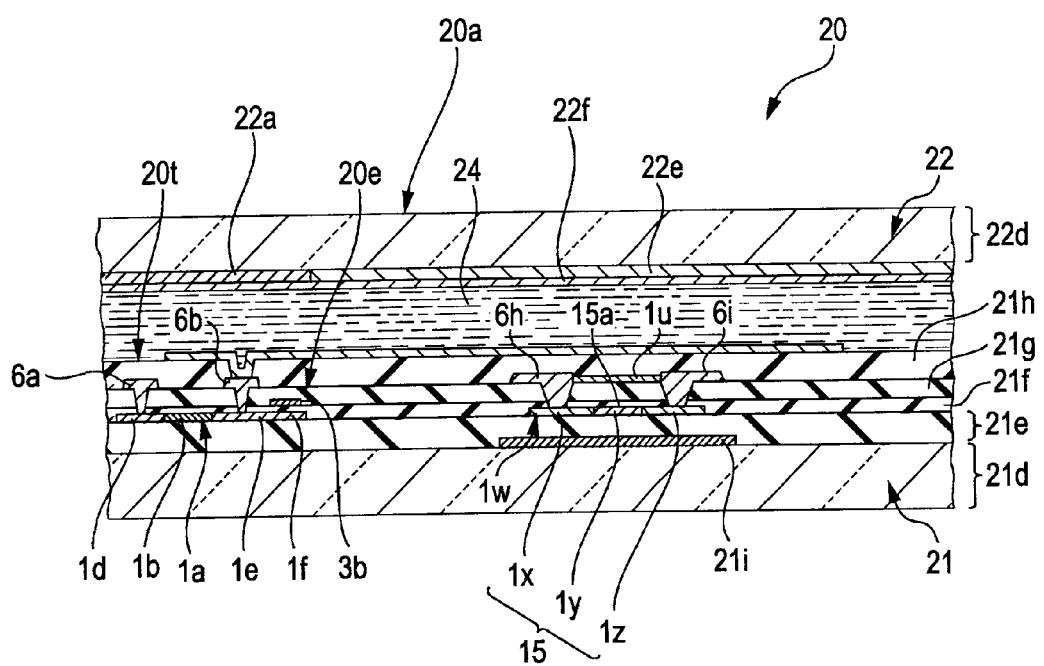
FIG. 4 is a sectional view illustrating a configuration of a pixel of the electric optical panel of the display device with the position detecting function according to the first embodiment of the invention.

FIG. 4 is a sectional view showing a configuration of a pixel of the electric optical panel 20 of the display device 100 with the position detecting function according to the first embodiment of the invention. As shown in FIG. 4, in the element substrate 21, a foundation protective film 21e formed from a silicon oxide film or the like is formed on a surface of a transmissive substrate 21d such as glass, and an N-channel-type thin-film transistor 20t is formed at a position overlapped with the pixel electrode 9a in the surface. In the thin-film transistor 20t, an island-shaped semiconductor film 1a is provided with a source region 1d and a drain region 1e. A gate insulation film 21f formed from a silicon oxide film or the like is formed on the upper surface of the semiconductor film 1a, and the scanning line 3a is formed on the upper surface of the gate insulation film 21f. A part of the scanning line 3a faces a channel formation region 1b through the gate insulation film 21f as a gate electrode.

Interlayer insulation films 21g and 21h are formed on the upper layer side of the thin-film transistor 20t. The surface of the interlayer insulation film 21h is provided with the data line 6a and the drain electrode 6b, and the data line 6a is electrically connected to a source region 1d through a contact hole formed in the interlayer insulation film 21h. The surface of the interlayer insulation film 21g is provided with the pixel electrode 9a formed from an ITO film. The pixel electrode 9a is electrically connected to the drain electrode 6b through a contact hole formed in the interlayer insulation film 21g, and the drain electrode 6b is electrically connected to the drain region 1e through a contact hole formed in the gate insulation film 21f and the interlayer insulation film 21g. The storage capacitor 20e is formed in such a manner that a potion if (lower electrode) extended from the drain region 1e faces the capacitance line 3b (upper electrode) formed as the same layer with the scanning line 3a with an insulation film (dielectric film) simultaneously formed with the gate insulation film 21f interposed therebetween.

In the counter substrate 22, a light shielding film 22a called a black matrix is formed in a position facing the pixel electrode 9a in the transmissive substrate 22d such as glass, and a color filter 22e is formed in a region surrounded by the light shielding film 22a. In the counter substrate 22, a common electrode 22f formed from an ITO film is formed on the upper layer side of the light shielding film 22a and the color filter 22e. The liquid crystal 24 is held between the counter substrate 22 and the element substrate 21.

In the electric optical panel 20 with such a configuration, the plurality of pixels 20a serves as sub-pixels facing red (R), green (G), and blue (B) as shown in FIG. 3 by using the color filter 22e.

Configuration of Light Receiving Element 15

In FIGS. 1, 2A, 3, and 4, in the display device 100 with the position detecting function according to the embodiment, the light receiving element 15 of the optical position detecting device 10 includes a photo diode formed in the electric optical panel 20. In the embodiment, the light receiving element 15 is formed in one pixel 20a among the plurality of pixels 20a within the image display region 20R in the element substrate 21. For this reason, in the display device 100 with the position detecting function and the optical position detecting device 10 according to the embodiment, an externally attached light receiving element is not used.

In order to form the light receiving element 15, in the embodiment, as shown in FIG. 4, a PIN-connection-type photodiode (semiconductor element) is formed between a foundation protective film 21e and a gate insulation film 21f in the element substrate 21. In the light receiving element 15, a semiconductor film 1w is provided with an N-type region 1x, an intrinsic region 1y, and a P-type region 1z which are sequentially arranged. In addition, in the light receiving element 15, wirings 6h and 6i formed on the upper layer of the interlayer insulation film 21g are electrically connected to the N-type region 1x and the P-type region 1z, respectively, through the contact hole. On the side where the transmissive substrate 21d is located in the semiconductor film 1w, in the embodiment, between the transmissive substrate 21d and the foundation protective film 21e, a light shielding film 21i including a single layer film such as a molybdenum film, an aluminum film, a titanium film, a tungsten film, a tantalum film, or a chrome film or a lamination film is formed so as to be overlapped with the light receiving element 15. For this reason, there is no case in which the position detecting infrared light L2a to L2d emitted from the light guiding plate 13 is directly incident to the intrinsic region 1y.

In the light receiving element 15, the semiconductor film 1w is a polysilicon film which is simultaneously formed with the semiconductor film 1a constituting the thin-film transistor 20t. The N-type region 1x is a high-concentration N-type region which is simultaneously formed with the high-concentration N-type region of the thin-film transistor 20t. The P-type region 1z is a high-concentration P-type region. In the case where a complementary thin-film transistor is formed on the element substrate 21, the P-type region 1z is simultaneously formed with the high-concentration P-type region of the complementary thin-film transistor. The wirings 6h and 6i are metal films which are simultaneously formed with the data line 6a and the drain electrode 6b.

The light receiving element 15 with such a configuration is able to detect the position detecting infrared light L2a to L2d which is incident from the counter substrate 22. Here, in order to allow the light receiving element 15 to respond only to infrared light and not to respond to visible light, for example, in the light receiving portion 15a located on the side of the counter substrate 22 in the intrinsic region 1y, a region overlapped with the counter substrate 22 may be provided with a wavelength selection filter 1u.

Principle of Detection

By referring to FIGS. 1, 2A, and 2B, a method of obtaining position information of the target object Ob on the basis of the detection of the light receiving element 15 will be described. As the method of obtaining the position information, various methods may be supposed, but as one example, a method may be exemplified which obtains a coordinate position in a direction of connecting two corresponding light sources in such a manner that an attenuation coefficient ratio is obtained on the basis of a detected light amount ratio of two position detecting infrared light, and a propagation distance of both position detecting infrared light is obtained from the attenuation coefficient ratio.

Hereinafter, a case will be mainly described in which the position detecting light sources 12A and 12B are respectively used as the first and second position detecting light sources, and the position detecting infrared light L2a and L2b is respectively used as the first and second position detecting infrared light.

In the display device 100 with the position detecting function according to the embodiment, the position detecting infrared light L2a to L2d emitted from the position detecting light sources 12A to 12D is respectively incident to the inside of the light guiding plate 13 from the light incident portions 13a to 13d, and is gradually emitted from the light emitting surface 13s while being propagated into the light guiding plate 13. As a result, the position detecting infrared light L2a to L2d is emitted from the light emitting surface 13s in a surface shape.

For example, the position detecting infrared light L2a is gradually emitted from the light emitting surface 13s while being propagated into the light guiding plate 13 from the light incident portion 13a toward the light incident portion 13b. In addition, the position detecting infrared light L2b is gradually emitted from the light emitting surface 13s while being propagated into the light guiding plate 13 from the light incident portion 13b toward the light incident portion 13a.

In addition, the position detecting infrared light L2a to L2d passes through the optical sheet 16 and the electric optical panel 20 and is emitted from the entire detection region 10R toward the visible side (operation side) of the board plate 30. Accordingly, when the target object Ob such as a finger is disposed on the visible side (operation side) of the board plate 30, the position detecting infrared light L2a to L2d is reflected by the target object Ob, and a part of the reflected light is detected by the light receiving element 15.

At this time, as shown in FIG. 2B, each of the position detecting infrared light L2a and L2b emitted from the position detecting light sources 12A and 12B travels forward while being emitted from the light emitting surface 13s of the light guiding plate 13. For this reason, the light amount of the position detecting infrared light L2a emitted to the detection region 10R is attenuated as depicted by the solid line in FIG. 2B in accordance with a distance from the position detecting light source 12A, and the light amount of the position detecting infrared light L2b emitted to the detection region 10R is attenuated as depicted by the dotted line in FIG. 2B while having a positive correlation with respect to the distance from the position detecting infrared light 12B.

Here, when a control amount (for example, a current amount), a conversion coefficient, and an emitted light amount of the first position detecting light source 12A are denoted by Ia, k, and Ea, and a control amount (for example, a current amount), a conversion coefficient, and an emitted light amount of the second position detecting light source 12B are denoted by Ib, k, and Eb, Ea=k·Ia and Eb=k·Ib.

In addition, when an attenuation coefficient and a detected light amount of the first position detecting infrared light L2a are denoted by fa and Ga, and an attenuation coefficient and a detected light amount of the second position detecting infrared light L2b are denoted by fb and Gb, Ga=fa·Ea=fa·k·Ia and Gb=fb·Eb=fb·k·Ib.

Accordingly, when the light receiving element 15 is able to detect a ratio Ga/Gb of a detected light amount of both position detecting infrared light, Ga/Gb=(fa·Ea)/(fb·Eb)=(fa/fb)·(Ia/Ib).

For this reason, when values corresponding to a ratio Ea/Eb of the emitted light amount and a ratio Ia/Ib of the control amount are obtained, a ratio fa/fb of the attenuation coefficient may be obtained. Since there is a positive correlation between the attenuation coefficient ratio and the propagation distance ratio of both position detecting infrared light, when the correlation is set in advance, it is possible to obtain the position information of the target object Ob (a position coordinate in a direction from the first position detecting light source toward the second position detecting light source).

As a method of obtaining the attenuation coefficient ratio fa/fb, for example, the first position detecting light source 12A and the second position detecting light source 12B are flickered in a reverse phase (for example, a driving signal of a rectangular waveform or a sine waveform is operated as a frequency capable of ignoring a phase difference caused by a difference in propagation distance so as to have a phase difference of 180°), and then the waveform of the detected light amount is analyzed. In more detail, for example, one control amount Ia is fixed (Ia=Im), the other control amount Ib is controlled so that the detected waveform is not observed, that is, the detected light amount ratio Ga/Gb is equal to 1, and then the attenuation coefficient ratio fa/fb is derived from the control amount Ib=Im·(fa/fb) at this time.

In addition, the control may be performed so that the sum of both control amounts is normally constant, that is, Im=Ia+Ib is satisfied.

In this case, since Ib=Im·fb/(fa+fb) is obtained, when fb/(fa+fb)=α, the attenuation coefficient ratio is obtained by fa/fb=(1−α)/α.

In the embodiment, the position information in the direction depicted by the arrow X of the target object Ob is obtained by driving the first position detecting light source 12A and the second position detecting light source 12B in the reverse phase. In addition, the position information in the direction depicted by the arrow Y of the target object Ob is obtained by driving the first position detecting light source 12C and the second position detecting light source 12D in the reverse phase. Accordingly, it is possible to obtain the position coordinate of the target object Ob in plane by sequentially performing the detection operation in the directions depicted by the arrows X and Y in the control system.

In addition, it is possible to obtain the position coordinate of the target object Ob in plane in such a manner that the case in which the position detecting light sources 12A and 12C used as the first position detecting light source are driven in the same phase, the position detecting light sources 12B and 12D used as the second position detecting light source are driven in the same phase, and the first and second position detecting light sources are driven in the reverse phase so as to perform the detection is changed to the case in which the position detecting light sources 12A and 12D used as the first position detecting light source are driven in the same phase, the position detecting light sources 12B and 12C used as the second position detecting light source are driven in the same phase, and the first and second position detecting light sources are driven in the reverse phase so as to perform the detection, and the coordinate is sequentially obtained. According to the configuration in which the plural position detecting light sources are turned on, for example, the emitted light amount distribution (a contrast inclination distribution of the position detecting infrared light) in the direction from the first position detecting light source toward the opposite second position detecting light source or the reverse direction thereof is appropriately obtained in the range wider than that of the case of turning on one position detecting light source, thereby performing more accurate position detection.

As described above, when the planar position information inside the detection region 10R of the target object Ob is obtained on the basis of the light amount ratio of the first and second position detecting infrared light detected by the light receiving element 15, for example, a configuration may be adopted in which a microprocessor unit (MPU) is used as a signal processor, and a process is performed in accordance with the execution of a predetermined software (operation program). In addition, a configuration may be adopted in which a process of the signal processor is performed by using hardware such as a logic circuit. Such a signal processor may be assembled as a part of the display device 100 with the position detecting function, or may be provided inside of an electronic apparatus mounted with the display device 100 with the position detecting function.

In addition, as the method of obtaining the position information, in addition to the method based on the light amount ratio of the first and second position detecting infrared light corresponding to the propagation distance inside the light guiding plate 13, for example, a method based on a phase difference of the first and second position detecting infrared light corresponding to the propagation distance may be supposed. In this case, the planar position information of the target object Ob is calculated in accordance with a relationship between a degree of the phase difference and a difference in propagation distance.

Main Advantage of the Embodiment

As described above, in the display device 100 with the position detecting function according to the embodiment, since there are provided the optical position detecting device 10 and the image creating device 200, the light receiving element (photo diode) formed on the electric optical panel 20 is used as the light receiving element 15 of the optical position detecting device 10. For this reason, since it is not necessary to attach the light receiving element to the outside, it is possible to decrease the size in the external shape or the thickness direction of the optical position detecting device 10 and the display device 100 with the position detecting function by as much as the space used to dispose the light receiving element. In addition, since it is not necessary to attach the light receiving element to the outside of the electric optical panel 20 or the like, it is possible to realize a decrease in cost.

In addition, the light receiving element 15 is formed on the element substrate 21 where the pixel electrode 9a is formed in the electric optical panel 20. For this reason, it is possible to form the light receiving element by using a part of the manufacturing process of the pixel switching thin-film transistor 20t. Accordingly, even when the light receiving element 15 is formed in the electric optical panel 20, it is possible to maximally suppress an increase in the number of the manufacturing processes.

In addition, the light receiving element 15 is formed within the image display region 20R of the electric optical panel 20, and the image display region 20R and the detection region 10R are overlapped with each other. For this reason, when the light receiving element 15 is formed within the image display region 20R, it is possible to reliably receive the position detecting infrared light L2a to L2d reflected by the target object Ob.

Second Embodiment

Figure 5:
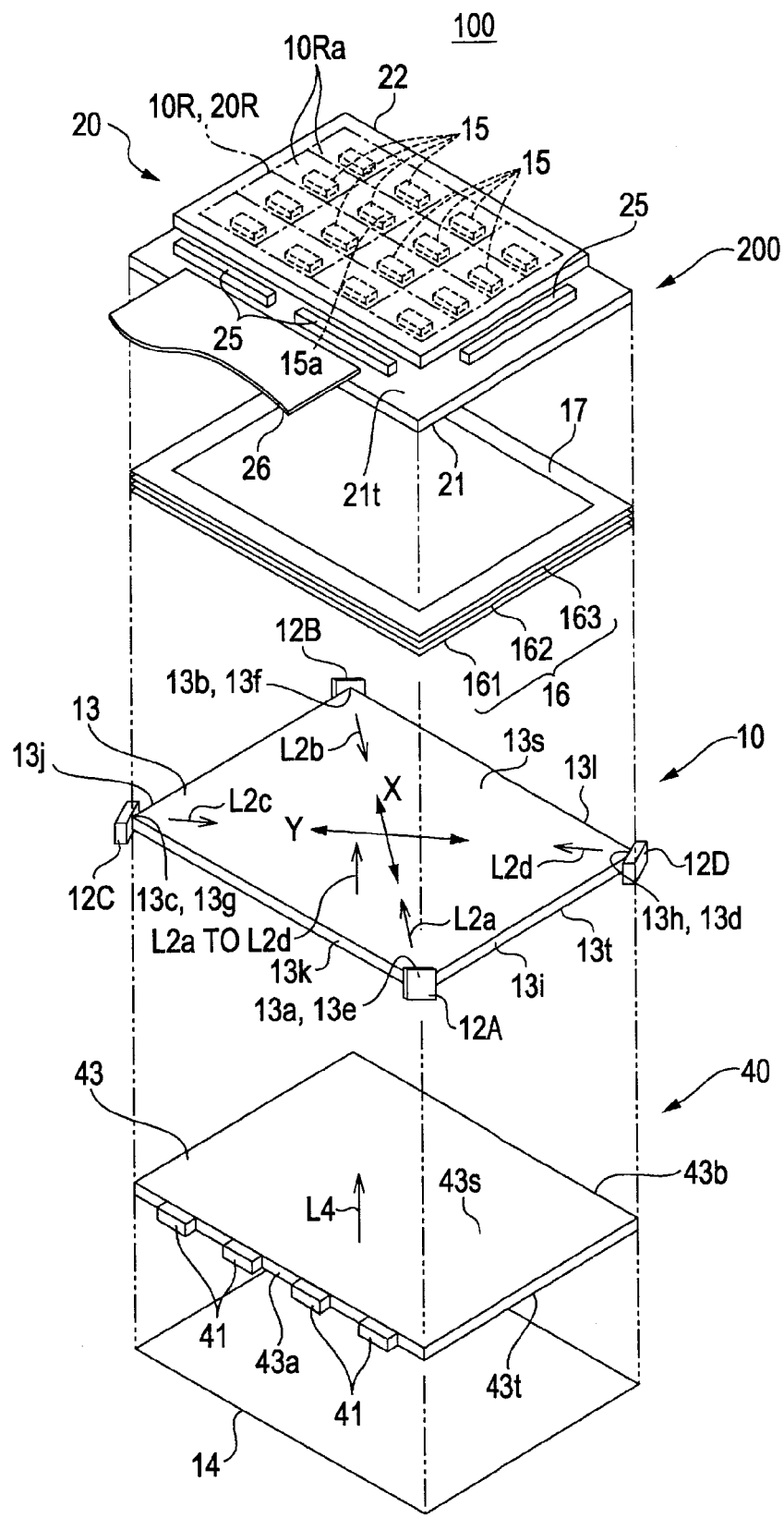
FIG. 5 is an exploded perspective view schematically illustrating a configuration of the display device with the position detecting function according to a second embodiment of the invention.
Figure 6:
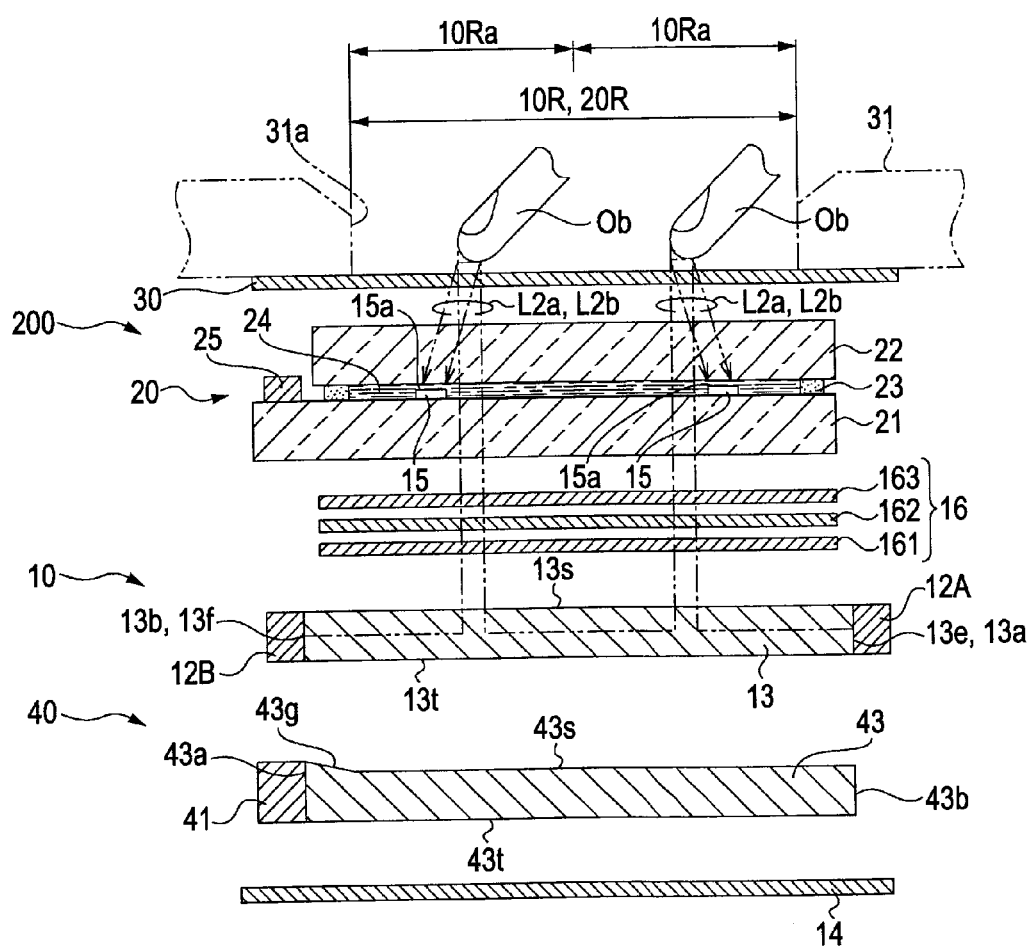
FIG. 6 is a sectional view schematically illustrating a sectional configuration of the display device with the position detecting function according to the second embodiment of the invention.
Figure 7:
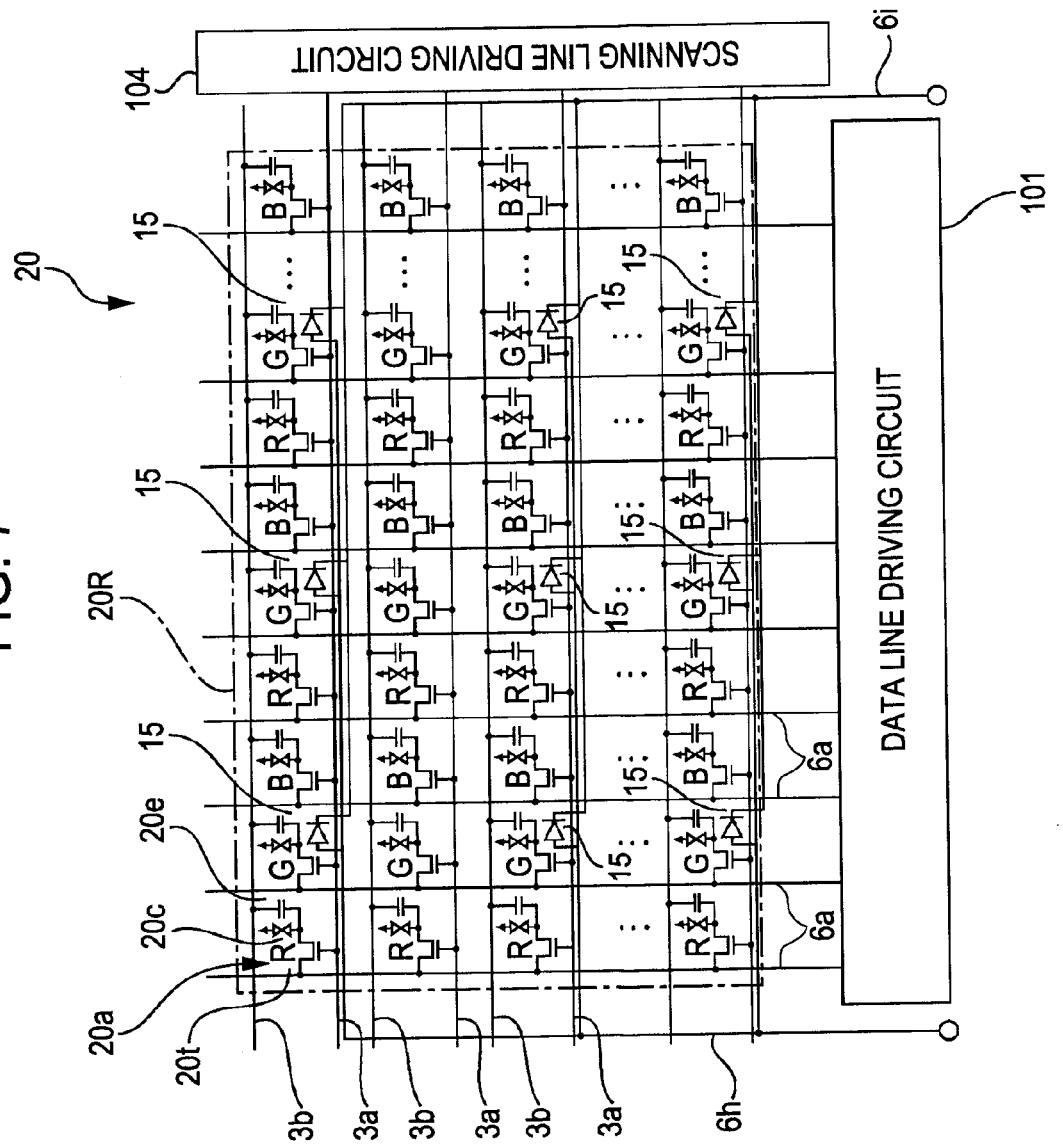
FIG. 7 is an explanatory diagram illustrating an electric configuration of the electric optical panel of the display device with the position detecting function according to the second embodiment of the invention.

FIG. 5 is an exploded perspective view schematically illustrating a configuration of the display device with the position detecting function according to a second embodiment of the invention. FIG. 6 is a sectional view schematically illustrating a sectional configuration of the display device with the position detecting function according to the second embodiment of the invention. In addition, in FIG. 6, the wirings 6h and 6i for the plurality of light receiving elements 15 are simply depicted by one line. In addition, since the basic configuration of the embodiment is the same as that of the first embodiment, the same reference numerals are given to the same constituents, and the description thereof is omitted.

As shown in FIGS. 5 and 6, the display device 100 with the position detecting function according to the embodiment also includes the optical position detecting device 10 and the image creating device 200 as in the first embodiment, and the optical position detecting device 10 detects the planar position of the target object Ob when the target object Ob such as a finger moves close to the detection region 10R on the basis of, for example, the image displayed by the image creating device 200. In addition, the light receiving element 15 of the optical position detecting device 10 includes the light receiving element (photo diode) formed on the electric optical panel 20 as in the first embodiment.

In the embodiment, the plurality of light receiving elements 15 is formed on the element substrate 21 of the electric optical panel 20, and each of them detects the position of the target object Ob in a plurality of regions 10Ra obtained by dividing the detection region 10R. For this reason, as schematically shown in FIG. 6, when the target object Ob moves close to two regions 10Ra, the light receiving elements 15 are able to independently receive the position detecting infrared light L2a to L2d reflected by the target object Ob in its regions 10Ra. Accordingly, according to the embodiment, it is possible to perform an information input using a relative movement of two or more target objects Ob inside the detection region 10R. In this case, it is desirable to dispose the light receiving elements 15 so that the regions 10Ra of the plurality of light receiving elements 15 are not overlapped with each other.

In order to form the display device 100 with the position detecting function, in the embodiment, as understood by FIG. 6, all the plurality of light receiving elements 15 are formed in the pixels 20a of green (G). For this reason, in the pixel 20a corresponding to green (G), a pixel aperture ratio (a ratio of a display light emitting region in the pixel) is reduced, but in the embodiment, an image signal supplied to the pixel 20a corresponding to green (G) is corrected in order to correct a luminance reduction caused by the reduction of the pixel aperture ratio. In addition, in the embodiment, since the light receiving element 15 is formed in the pixel 20a of green (G) having the highest visibility, even when the pixel aperture ratio of the pixel 20a of green (G) is reduced, it is possible to ensure a sufficient amount of luminance for the light of green (G). Accordingly, according to the embodiment, it is possible to display a color image having a high quality level.

Other Embodiments

The optical position detecting device and the display device 100 with the position detecting function according to the invention are not limited to the above-described embodiments, but may be, of course, modified into various forms within the scope not departing from the spirit of the invention. For example, in the above-described embodiments, the light receiving element 15 is formed inside the pixel 20a of the electric optical panel 20, but the light receiving element 15 may be formed in a region not included in the image display region 20R of the electric optical panel 20. In addition, in the above-described embodiments, the light receiving element 15 is formed on the element substrate 21 of the electric optical panel 20, the light receiving element 15 may be formed on the counter substrate 22. Further, in the above-described embodiment, the counter substrate 22 is disposed on the side of the display light emitting side of the element substrate 21, but the invention may be applied to the case in which the element substrate 21 is disposed on the display light emitting side of the counter substrate 22.

In the embodiment, the liquid crystal panel is used as the electric optical panel 20, but other types of electric optical panels such as an organic electroluminescence panel may be used. Even in the organic electroluminescence panel, since the pixel switching thin-film transistor or pixel electrode is formed on the element substrate, it is possible to form the light receiving element 15 by using a part of the manufacturing process.

Mounting Example to Electronic Apparatus

Figure 8A:
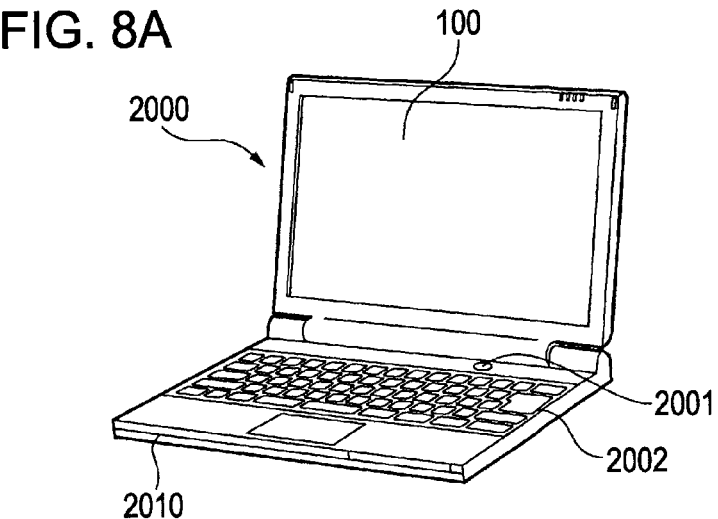
FIGS. 8A, 8B, and 8C are explanatory diagrams illustrating electronic apparatuses using the display device with the position detecting function according to the invention.
Figure 8B:
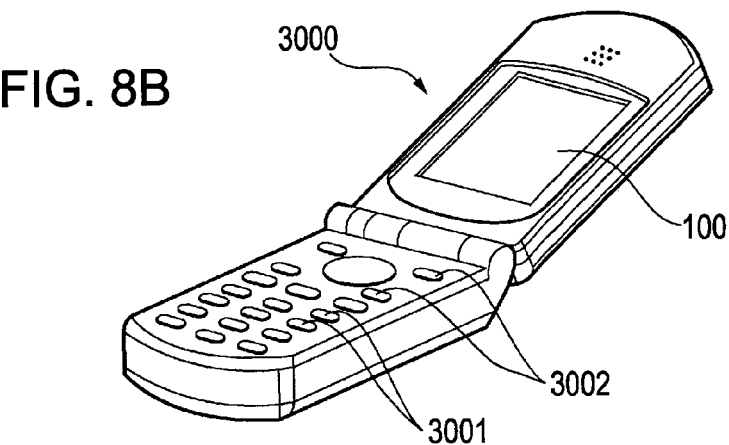
Figure 8C:
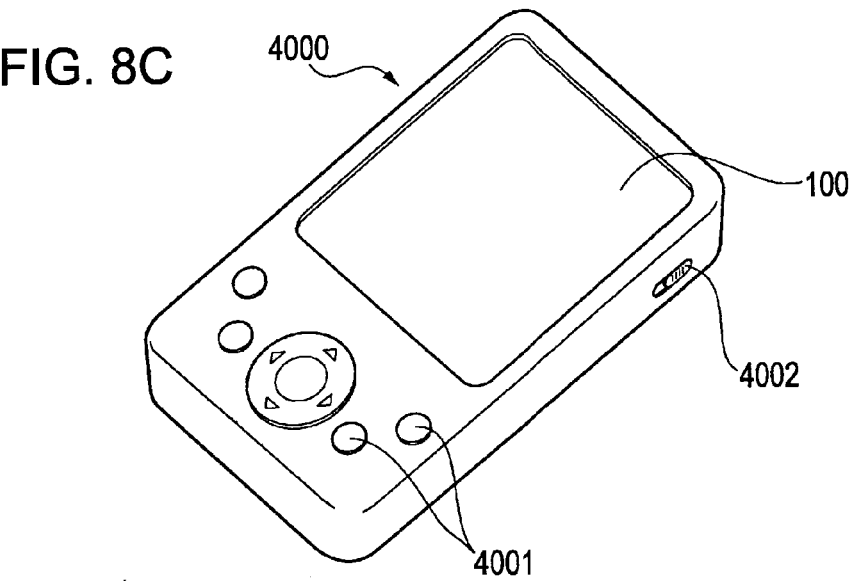

Next, an electronic apparatus adopting the display device 100 with the position detecting function according to the above-described embodiments will be described. FIG. 8A illustrates a configuration of a mobile personal computer having the display device 100 with the position detecting function. A personal computer 2000 includes the display device 100 with the position detecting function as a display unit and a main body 2010. The main body 2010 is provided with a power switch 2001 and a keyboard 2002. FIG. 8B illustrates a configuration of a cellular phone having the display device 100 with the position detecting function. A cellular phone 3000 includes plural operation buttons 3001, a scroll button 3002, and the display device 100 with the position detecting function as a display unit. When the scroll button 3002 is operated, a screen displayed on the display device 100 with the position detecting function is scrolled. FIG. 8C illustrates a configuration of a PDA (Personal Digital Assistants) adopting the display device 100 with the position detecting function. A PDA 4000 includes plural operation buttons 4001, a power switch 4002, and the display device 100 with the position detecting function as a display unit. When the power switch 4002 is operated, information such as an address list or a schedule book is displayed on the display device 100 with the position detecting function.

In addition, as the electronic apparatus adopting the display device 100 with the position detecting function, as well as the examples shown in FIGS. 8A, 8B, and 8C, electronic apparatuses such as a digital still camera, a liquid crystal television, a viewfinder-type or a monitor-type video tape recorder, a car navigation device, a pager, an electronic note, a calculator, a word processor, a workstation, a television telephone, a POS terminal, and a bank terminal may be exemplified. In addition, as the display units of the various electronic apparatuses, the above-described display device 100 with the position detecting function may be used.

The entire disclosure of Japanese Patent Application No. 2009-050288, filed Mar. 4, 2009 is expressly incorporated by reference herein.

What is claimed is:

1. A display device with a position detecting function, the display device comprising:
an optical position detecting device which includes
a position detecting light source including
a first light source configured to emit a first position detecting infrared light having a light amount Ea attenuated along a first direction and having an attenuation coefficient fa, and
a second light source configured to emit a second position detecting infrared light having a light amount Eb attenuated along a second direction opposite to the first direction and having an attenuation coefficient fb, and
a light receiving element configured to
receive the first position detecting infrared light and the second position detecting infrared light reflected by a target object inside a detection region, detect a light amount Ga of the first position detecting infrared light reflected by the target object and a light amount Gb of the second position detecting infrared light reflected by the target object, and detect a position of the target object on the basis of the light amount Ga, the light amount Gb, the light amount Ea, the light amount Eb, the attenuation coefficient fa, and the attenuation coefficients fb, and an image creating device which includes an image display region of an electric optical panel in a region overlapped with the detection region, the electric optical panel including a first substrate including a plurality of scanning lines and a plurality of data lines, and a second substrate opposite to the first substrate, wherein the light receiving element is constituted by a semiconductor element formed on the first substrate of the electric optical panel.

2. The display device according to claim 1, wherein the light receiving element is formed on the first substrate where a pixel electrode is formed in the electric optical panel.

3. The display device according to claim 1, wherein the light receiving element is formed within the image display region of the electric optical panel.

4. The display device according to claim 1, wherein a plurality of light receiving elements is formed on the electric optical panel.

5. The display device according to claim 4, wherein each of the light receiving elements is configured to individually receive the first position detecting infrared light and the second position detecting infrared light reflected by each of two or more target objects inside the detection region and detect the position of each of the two or more target objects based on the light amount Ga and the light amount Gb detected.

6. The display device according to claim 4,
wherein the electric optical panel includes pixels corresponding to a plurality of difference colors, and
wherein the light receiving elements are formed in the pixels corresponding to the same color.

7. The display device according to claim 1, wherein the optical position detecting device further includes a light guiding plate which is disposed on one side of the electric optical panel opposite to the other side where the detection region is located, the light guiding plate including a light incident surface for receiving the first position detecting infrared light and the second position detecting infrared light emitted from the position detecting light source, and a light emitting surface for emitting the first position detecting infrared light and the second position detecting infrared light incident from the light incident surface toward the detection region.

8. The display device according to claim 1, comprising two pairs of light sources each including the first and second position detecting light sources, wherein the two pairs of light sources are arranged in directions such that emitted light axes of the two pairs of light sources intersect each other.

9. An electronic apparatus, comprising:
the display device according to claim 1.

10. The display device according to claim 1, wherein
the first and second light sources are located on the same level distant from the electric optical panel, and
the light receiving element is located on a level different from the level of the first and second light sources.

11. The display device according to claim 10, further comprising an optical sheet provided on a level between (i) the level of the first and second light sources and (ii) the level of the light receiving element and configured to equalize the first position detecting infrared light and the second position detecting infrared light.

12. The display device according to claim 1 wherein one light receiving element is formed on the electric optical panel.

13. A display device with a position detecting function, the display device comprising:

a position detecting function surface which is arranged at a surface of the display device;

a light guiding plate;

a first position detecting light source having a first position detecting light emitting surface that faces a first position detecting light incident portion of the light guiding plate;

second position detecting light source having a second position detecting light emitting surface that faces a second position detecting light incident portion of the light guiding plate; and an electro optical panel overlapping the light guiding plate and including a first substrate including a plurality of scanning lines and a plurality of data lines, a second substrate opposite to the first substrate, and a plurality of position detecting light receiving elements each constituted by a semiconductor element and formed on the first substrate, wherein the first position detecting light source and the second position detecting light source are configured to alternately emit a first position detecting infrared light and a second position detecting infrared light, respectively, the first position detecting infrared light having a light amount Ea attenuated along a first direction and having an attenuation coefficient fa, and the second position detecting infrared light having a light amount Eb attenuated along a second direction opposite to the first direction and having an attenuation coefficient fb, the light guiding plate is configured to propagate the first position infrared detecting light emitted to the first position detecting light incident portion, and to emit the propagated first position detecting infrared light from a surface of the light guiding plate toward the position detecting function surface to be reflected by a target, the light guiding plate is further configured to propagate the second position detecting infrared light emitted to the second position detecting infrared light incident portion, and to emit the propagated second position detecting infrared light from the surface of the light guiding plate toward the position detecting function surface to be reflected by the target, and each of the position detecting light receiving elements is configured to individually receive the first position detecting infrared light and the second position detecting infrared light reflected by each of two or more target objects, detects a light amount Ga of the first position detecting infrared light reflected by the target objects and a light amount Gb of the second position detecting infrared light reflected by the target objects, and detects a position of each of the two or more target objects based on the light amount Ga and the light amount Gb.

14. The display device according to claim 13, wherein at least one of the position detecting light receiving elements is configured to receive the first position detecting infrared light and the second position detecting infrared light reflected by the target.

15. The display device according to claim 13, wherein at least one of the first position detecting light incident portion or the second position detecting light incident portion is provided at a corner of the light guiding plate.

16. The display device according to claim 13, wherein
when the first position detecting light source emits the first position detecting infrared light, the second position detecting light source is configured to be tuned off, and
when the second position detecting light source emits the second position detecting infrared light, the first position detecting light source is configured to be tuned off.

17. The display device according to claim 13, wherein the light guiding plate is disposed on one side of the electric optical panel opposite to the other side where the position detecting function surface is located.

18. The display device according to claim 13, further comprising two pairs of light sources each including the first position detecting light source and second position detecting light source, wherein
the two pairs of light sources are arranged in directions such that emitted light axes of the two pairs of light sources intersect each other.

19. An electronic apparatus, comprising:
the display device according to claim 11.

* * * * *